US012236527B2

United States Patent
Huang et al.

(10) Patent No.: US 12,236,527 B2
(45) Date of Patent: Feb. 25, 2025

(54) REMOTE-CONTROL SYSTEM, REMOTE-CONTROLLER, AND REMOTE-CONTROL METHOD

(71) Applicant: HTC Corporation, Taoyuan (TW)

(72) Inventors: Chun-Kai Huang, Taoyuan (TW); Jyun-Jhong Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 120 days.

(21) Appl. No.: 17/943,131

(22) Filed: Sep. 12, 2022

(65) Prior Publication Data

US 2024/0087224 A1 Mar. 14, 2024

(51) Int. Cl.
*G06T 17/05* (2011.01)
*G02B 27/01* (2006.01)
*G06F 3/14* (2006.01)
*G06T 7/579* (2017.01)
*G06T 7/70* (2017.01)
*G09G 3/00* (2006.01)

(52) U.S. Cl.
CPC ............ *G06T 17/05* (2013.01); *G02B 27/017* (2013.01); *G06F 3/14* (2013.01); *G06T 7/579* (2017.01); *G06T 7/70* (2017.01); *G09G 3/00* (2013.01); *G06T 2207/30204* (2013.01); *G06V 2201/07* (2022.01)

(58) Field of Classification Search
CPC .......................... G06T 19/06; G06F 3/14–153
See application file for complete search history.

(56) References Cited

U.S. PATENT DOCUMENTS

| | | | |
|---|---|---|---|
| 2014/0354685 A1* | 12/2014 | Lazarow | G06T 19/006 345/633 |
| 2017/0228922 A1* | 8/2017 | Kaeser | G06T 3/20 |
| 2017/0282062 A1* | 10/2017 | Black | A63F 13/25 |
| 2017/0337741 A1 | 11/2017 | Fradet et al. | |
| 2018/0285052 A1* | 10/2018 | Eade | B65G 1/0492 |
| 2020/0294313 A1* | 9/2020 | Arroyo Palacios | G06T 13/40 |
| 2021/0124180 A1* | 4/2021 | Amadio | G06K 7/10881 |
| 2022/0044481 A1* | 2/2022 | Tzeng | G06T 7/74 |

FOREIGN PATENT DOCUMENTS

| | | |
|---|---|---|
| CN | 106341606 | 1/2017 |
| CN | 111381787 | 7/2020 |
| TW | 201917676 | 5/2019 |
| TW | 202206982 | 2/2022 |
| WO | WO-2021263248 A1 * | 12/2021 |

OTHER PUBLICATIONS

"Office Action of Taiwan Counterpart Application", issued on Feb. 24, 2023, p. 1-p. 8.

* cited by examiner

*Primary Examiner* — Diane M Wills
(74) *Attorney, Agent, or Firm* — JCIPRNET

(57) ABSTRACT

A remote-control system, a remote-controller, and a remote-control method are provided. The remote-control method includes: obtaining environmental image data by an image capture device of a remote-controller; building a map according to the environmental image data based on simultaneous localization and mapping (SLAM) algorithm, and obtaining first location information of a first display in the map according to the environmental image data by the remote-controller; and receiving the first location information from the remote-controller and controlling the first display according to the first location information by a computing device.

11 Claims, 4 Drawing Sheets

REMOTE-CONTROL SYSTEM, REMOTE-CONTROLLER, AND REMOTE-CONTROL METHOD

BACKGROUND

Technical Field

The disclosure relates to extended reality (XR) technology, and particularly relates to a remote-control system, a remote-controller, and a remote-control method.

Description of Related Art

A user operating an XR system (e.g., virtual reality (VR) system, augmented reality (AR) system, or mixed reality (XR) system) may want to interact a television in a specific position. For example, a video game player wearing a head mounted display (HMD) may want to share the image he sees in the XR scene with others via a television, since not everyone has a head mounted display. However, the remote-controller of the conventional XR system can only interact with things in the XR scene. If the user wants to interact with the television (e.g., pointing a cursor on the television), the user must take off the head mounted display and then control the television via the remote-controller of the television.

SUMMARY

The disclosure is directed to a remote-control system, a remote-controller, and a remote-control method.

The disclosure is directed to a remote-control system comprising a first display, a remote-controller, and a computing device. The remote-controller comprises an image capture device, wherein the image capture device obtains environmental image data. The computing device communicatively connected to the remote-controller and the first display, wherein the remote-controller builds a map according to the environmental image data based on simultaneous localization and mapping (SLAM) algorithm, and obtains first location information of the first display in the map according to the environmental image data, wherein the computing device receives the first location information from the remote-controller and controls the first display according to the first location information.

In one embodiment, the remote-control system further comprising a second display. The second display communicatively connect to the computing device, wherein the remote-controller obtains second location information of the second display in the map according to the environmental image data, wherein the computing device controls the second display according to the second location information.

In one embodiment, the remote-control system further comprising a head mounted display. The head mounted display communicatively connected to the computing device, wherein the computing device controls the head mounted display to output an image data of the first display according to the first location information.

In one embodiment, the remote-control system further comprising a head mounted display. The head mounted display communicatively connected to the computing device, wherein the remote-controller obtains third location information of the head mounted display and forwards the third location information to the computing device, wherein the computing device controls the head mounted display to output an image data of the first display according to the first location information and the third location information.

In one embodiment, the first display displays a positioning marker according to a command from the computing device, wherein the remote-controller obtains the first location information according to the positioning marker included in the environmental image data.

In one embodiment, the positioning marker is an Aruco marker.

In one embodiment, the remote-controller further comprising an inertial measurement unit, wherein the remote-controller obtains pose data by the inertial measurement unit and determine a position of a cursor on the first display according to the pose data and the first location information, wherein the computing device controls the first display to show the cursor according to the position of the cursor.

In one embodiment, the computing device controls the first display according to a command corresponding to the cursor.

In one embodiment, the remote-controller controls the first display via the computing device, wherein the computing device allow the remote-controller to control the first display via a communication link between the computing device and the remote-controller.

In one embodiment, the map is corresponded to a Cartesian coordinate system, and the first location information comprises a coordinate of the first display.

The disclosure is directed to a remote-control method. The remote-control method includes: obtaining environmental image data by an image capture device of a remote-controller; building a map according to the environmental image data based on simultaneous localization and mapping (SLAM) algorithm, and obtaining first location information of a first display in the map according to the environmental image data by the remote-controller; and receiving the first location information from the remote-controller and controlling the first display according to the first location information by a computing device.

The disclosure is directed to a remote-controller adapted to control a first display. The remote-controller includes an image capture device, a processor, and a computing device. The image capture device is configured to obtain environmental image data. The processor is coupled to the image capture device and configured to build a map according to the environmental image data based on simultaneous localization and mapping (SLAM) algorithm, and obtain first location information of the first display in the map according to the environmental image data. The computing device is configured to receive the first location information and control the first display according to the first location information.

Based on the above description, the remote system of the present invention provides a way to locate a position of a display. The remote system further provides a way to interact with the display on the specific position by a remote-controller of the XR system.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
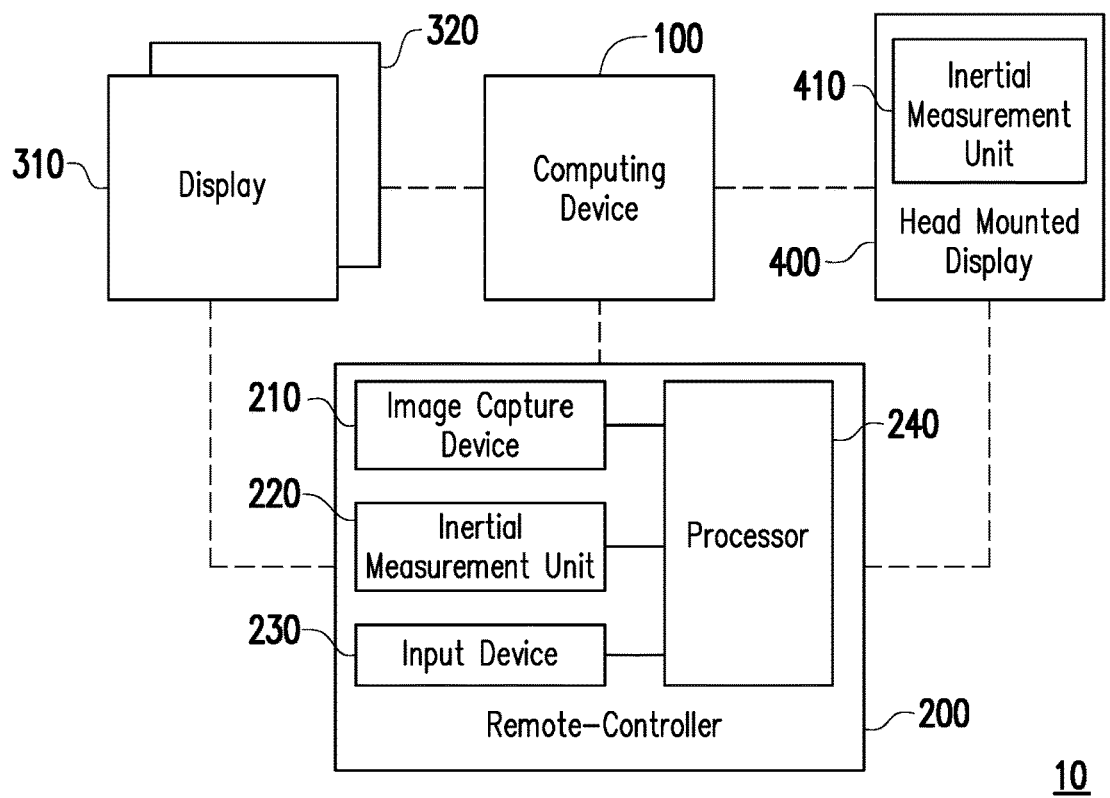
FIG. 1 illustrates a schematic diagram of a remote-control system according to an embodiment of the present invention.

FIG. 1 illustrates a schematic diagram of a remote-control system 10 according to an embodiment of the present invention, wherein the remote-control system 10 may be implemented in an extended reality (XR) system (e.g., virtual reality (VR) system, augmented reality (AR) system, or mixed reality (MR) system). The remote-control system 10 may include a computing device 100, a remote controller 200, and one or more displays. Although FIG. 1 only shows only two displays, display 310 and display 320, the number of the displays may be more than two. In one embodiment, the remote-control system 10 may further include a head mounted display 400. The computing device 100 may communicatively connect to the remote-controller 200, the display 310, the display 320, or the head mounted display 400. The remote-controller 200 may communicatively connect to the display 310, the display 320, or the head mounted display 400.

The computing device 100 may be a computer, a server, a client terminal, a desktop computer, a laptop computer, a work station, a personal computer (PC), a tablet, or a smart phone, the disclosure is not limited thereto. The computing device 100 may include necessary components to operate the computing device 100, such as a processing unit (e.g., a processor), a communication unit (e.g., a communication chip, a mobile communication chip, a Bluetooth chip, or a Wi-Fi chip), and a storage unit (e.g., a random-access memory (RAM), a read-only memory (ROM), a flash memory, a hard disk drive (HDD), or a solid state drive (SSD)).

The remote-controller 200 may be used for controlling the display 310, the display 320, or the head mounted display 400. The remote-controller 200 may include an image capture device 210, an inertial measurement unit (IMU) 220, an input device 230, and a processor 240, wherein the processor 240 may be coupled to the image capture device 210, the IMU 220, or the input device 230. The image capture device 210 or the IMU 220 may be control by the processing unit coupled to the image capture device 210 or the IMU 200. In addition, the remote-controller 20 may further include necessary components to operate the remote-controller 200, such as a communication unit and a storage unit.

The image capture device 210 may be a camera or a photographic device for capturing images. The image capture device 210 may include an image sensor such as a complementary metal oxide semiconductor (COMS) sensor, or a charge coupled device (CCD) sensor. The IMU 220 may include an accelerometer, a gyroscope, or a magnetometer. The input device 230 may be a button, a keyboard, or a touch screen.

The display 310 (or display 320) may be used for playing video data or image data. The display 310 may include necessary components to operate the display 310, such as a processing unit, a communication unit, and a storage unit. The display 310 may be a liquid-crystal display (LCD) or an organic light-emitting diode (OLED) display, the disclosure is not limited thereto.

The head mounted display 400 may be wear by a user for exploring extended reality scenes. The head mounted display 400 may include necessary components to operate the head mounted display 400, such as a processing unit, a communication unit, and a storage unit. In addition, the head mounted display 400 may further include an IMU 410. The IMU 410 may be control by the processing unit coupled to the IMU 410. The IMU 410 may include an accelerometer, a gyroscope, or a magnetometer.

In one embodiment, the computing device 100 may be embedded into the remote-controller 200, the display 310 (or display 320), or the head mounted display 400. In one embodiment, the computing device 100 is embedded into the remote-controller 200 and electrically coupled to the processor 240.

Figure 2:
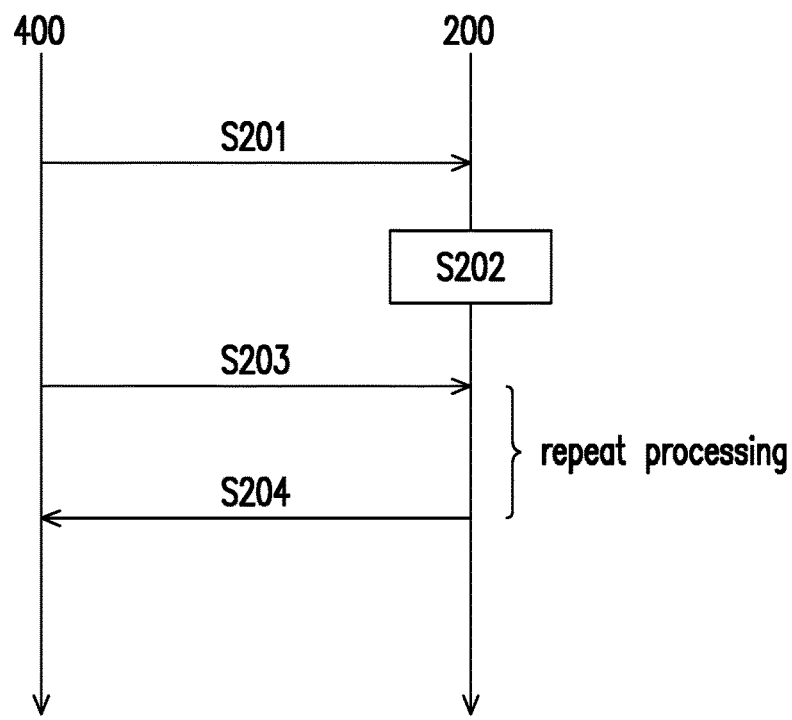
FIG. 2 illustrates a signaling diagram of the synchronization between the remote-controller and the head mounted display according to an embodiment of the present invention.

FIG. 2 illustrates a signaling diagram of the synchronization between the remote-controller 200 and the head mounted display 400 according to an embodiment of the present invention. Assuming the head mounted display 400 has obtained map for the extended reality scene, image data for the extended reality scene, and location information of the head mounted display 400, wherein the location information is corresponded to the coordinate system of the map. In step S201, the head mounted display 400 may transmit the map for the extended reality scene, the image data for the extended reality scene, and the location information of the head mounted display 400 to the remote-controller 200 via a communication protocol such as Bluetooth protocol. In step S202, the processor 240 of the remote-controller 200 may align the map for locating the head mounted display 400. Step S203 and step S204 are corresponded to a repeat processing. In step S203, the processor 240 of the remote-controller 200 may detect pose data of the head mounted display 400 is transmitted from the head mounted display 400 to the remote-controller 200, wherein the pose data of the head mounted display 400 may be generated by the IMU 410. The remote-controller 200 may perform synchronization with the head mounted display 400 according to the pose data of the head mounted display 400. In step S204, the head mounted display 400 may detect pose data of the remote-controller 200 is transmitted from the remote-controller 200 to the head mounted display 400, wherein the pose data of the remote-controller 200 may be generated by the IMU 220. The head mounted display 400 may perform synchronization with the remote-controller 200 according to the pose data of the remote-controller 200.

Figure 3:
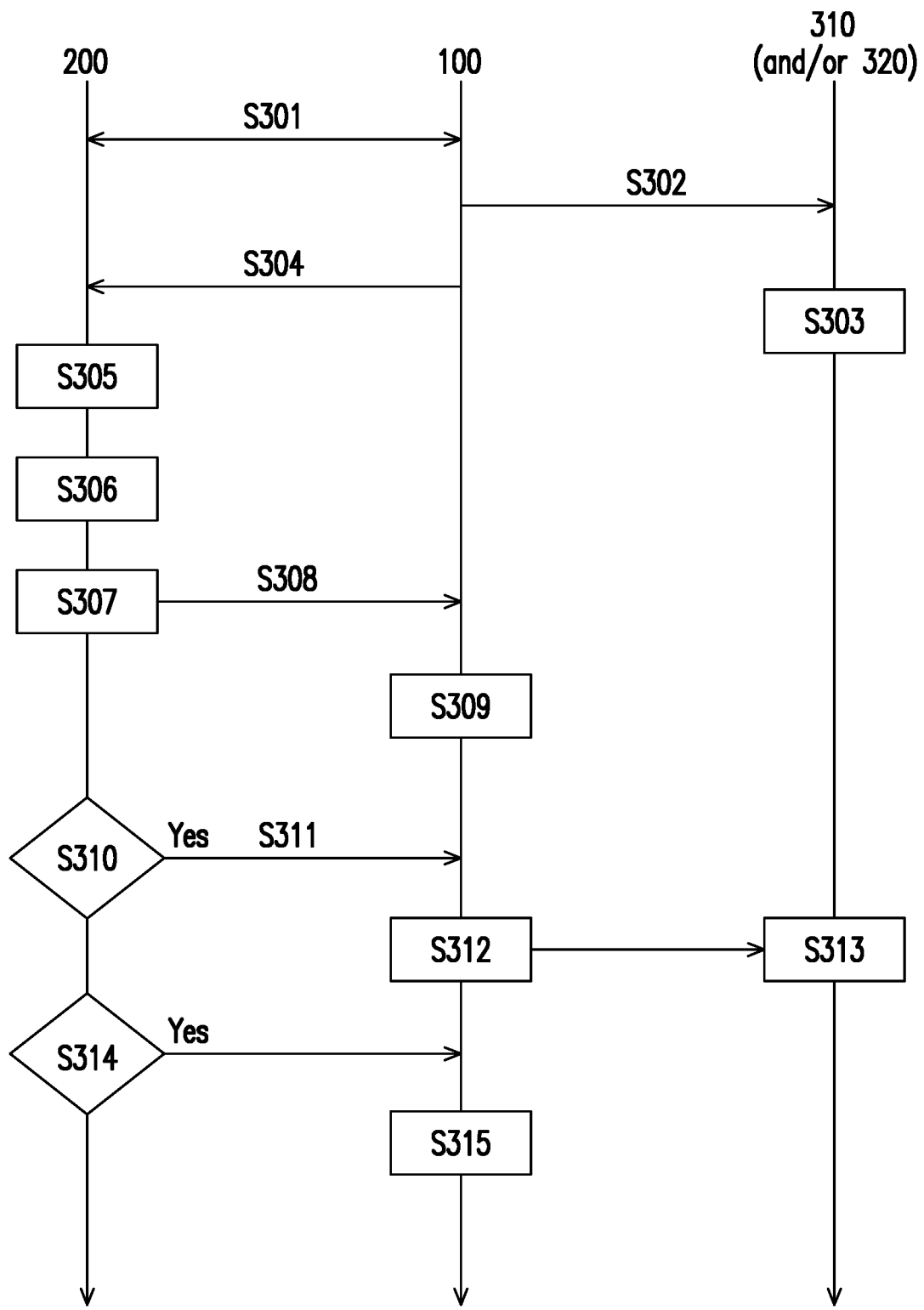
FIG. 3 illustrates a signaling diagram of the remote-control system according to an embodiment of the present invention.

FIG. 3 illustrates a signaling diagram of the remote-control system 10 according to an embodiment of the present invention. In step S301, the computing device 100 and the remote-controller 200 may communicatively connect to each other via communication protocol such as Bluetooth protocol.

Figure 4:
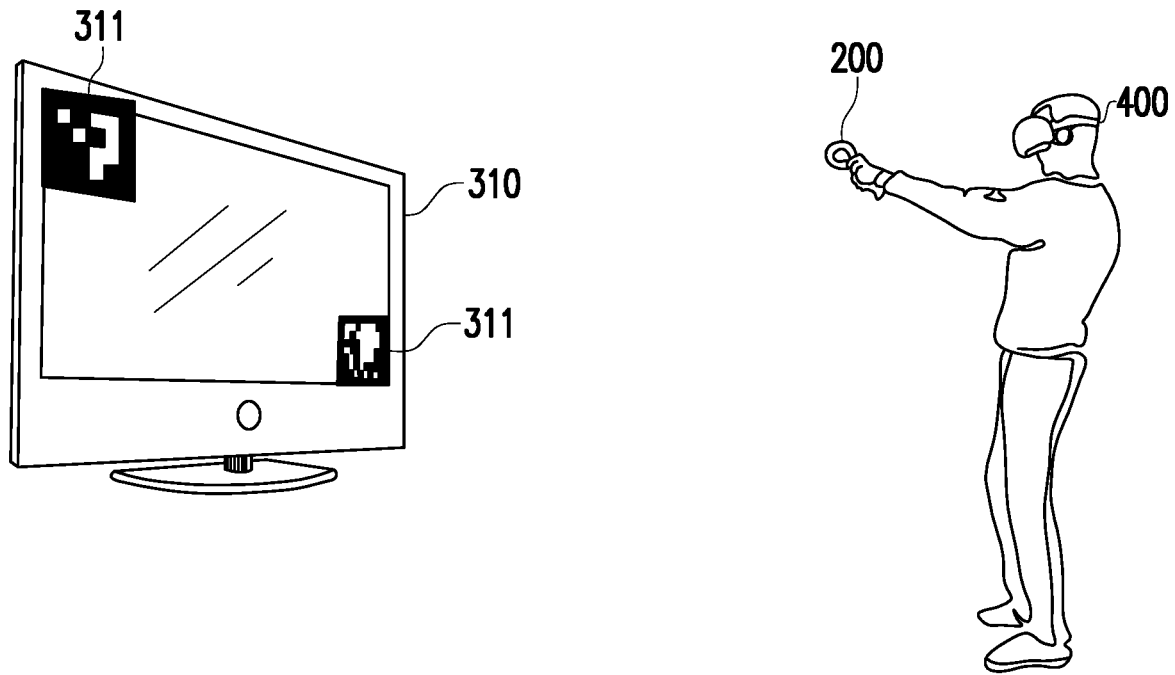
FIG. 4 illustrates a schematic diagram of the positioning marker according to an embodiment of the present invention.

In step S302, the computing device 100 may transmit a command to the display 310 (and/or display 320) to ask the display 310 (and/or display 320) to show a positioning marker. In step S303, the display 310 (and/or display 320)

may display a positioning marker according to the command from the computing device 100. FIG. 4 illustrates a schematic diagram of the positioning marker 311 according to an embodiment of the present invention. The display 310 (and/or display 320) may display one or more positioning markers 311 as shown in FIG. 4, wherein the positioning marker may include an Aruco marker. In one embodiment, the display 310 and the display 320 may display positioning markers respectively in the same time according to the command form the computing device 100.

Referring to FIG. 3, in step S304, the computing device 100 may notify the remote-controller 200 that the positioning marker 311 is being displayed by the display 310 (and/or display 320). In step S305, the processor 240 of the remote-controller 200 may guide the user to use the remote-controller 200 to aim at the display 310 (and/or display 320). In step S306, the processor 240 of the remote-controller 200 may detect the positioning marker 311. Specifically, the image capture device 210 of the remote-controller 200 may obtain environmental image data. When the user aims the remote-controller 200 at the display 310 (and/or display 320), the environmental image data obtained by the image capture device 210 may include positioning marker 311 displayed by the display 310 (and/or display 320). The processor 240 of the remote-controller 200 may detect the positioning marker 311 in the environmental image data based on, for example, object detection technology.

In step S307, the processor 240 of the remote-controller 200 may build a map according to the environmental image data based on simultaneous localization and mapping (SLAM) algorithm, wherein the map may be corresponded to a Cartesian coordinate system of an extended reality environment. The processor 240 of the remote-controller 200 may further obtain, from the environmental image data, the location information of the display 310 (and/or display 320) according to the positioning marker 311, wherein the location information of the display 310 (and/or display 320) may include a coordinate of the display 310 (and/or display 320) corresponding to the Cartesian coordinate system.

In step S308, the computing device 100 may receive the location information of the display 310 (and/or display 320) from the remote-controller 200. In step S309, the computing device 100 may control the head mounted display 400 (not shown in FIG. 3) or the display 310 (and/or display 320) according to the location information of the display 310 (and/or display 320). Specifically, the computing device 100 may configure the image data outputted by the head mounted display 400 or the display 310 (and/or display 320) according to the location information of the display 310 (and/or display 320).

In one embodiment, the computing device 100 may control the head mounted display 400 to output an image data corresponding to the display 310 (and/or display 320) according to the location information of the display 310 (and/or display 320) and/or the location information of the head mounted display 400. The processor 240 of the remote-controller 200 may obtain the location information of the head mounted display 400 from the head mounted display 400 and may forward the location information of the head mounted display 400 to the computing device 100. The computing device 100 may control the head mounted display 400 to output image data corresponding to the display 310 (and/or display 320) according to the location information of the display 310 (and/or display 320) and/or the location information of the head mounted display 400, wherein the location information of the head mounted display 400 may include the pose data generated by the IMU 410.

For example, the computing device 100 may configure, according to the location information of the head mounted display 400 and/or the location information of the display 310 (and/or display 320), the head mounted display 400 to output the image data corresponding to the display 310 (and/or display 320), wherein the image data may represent the location or the shape of the display 310 (and/or display 320) such that the user of the head mounted display 400 may easily find the display 310 (and/or display 320) in the extended reality scene. Furthermore, since the content displayed by the display 310 (and/or display 320) may be configured by the computing device 100, the computing device 100 may configure the head mounted display 400 to output the image data including the same content which is being displayed by the display 310 (and/or display 320). Accordingly, even if the head mounted display 400 is outputting a virtual reality scene which does not show the real display 310 (and/or display 320) to the user, the user exploring the virtual reality environment may still watch the content shown by the display 310 (and/or display 320) in the virtual reality scene. In other words, the head mounted display 400 may show the user a virtual display 310 (and/or display 320) in the virtual reality scene, wherein the virtual display 310 (and/or display 320) can display the content as same as the display 310 (and/or display 320) in the real world.

In step S310, the processor 240 of the remote-controller 200 may determine whether the remote-controller 200 is being pointed to the display 310 (or display 320). Specifically, the IMU 220 may measure pose data of the remote-controller 200. The processor 240 of the remote-controller 200 may determine whether the remote-controller 200 is being pointed to the display 310 (or display 320) according to the pose data of the remote-controller 200 and the location information of the display 310 (or display 320). If the remote-controller 200 is being pointed to the display 310 (or display 320), the processor 240 of the remote-controller 200 may determine a position of a cursor on the display 310 (or display 320) according to the pose data of the remote-controller 200 and the location information of the display 310 (or display 320). Accordingly, the user of the head mounted display 400 may interact with multiple displays in the same time through the remote-controller 200.

Figure 5:
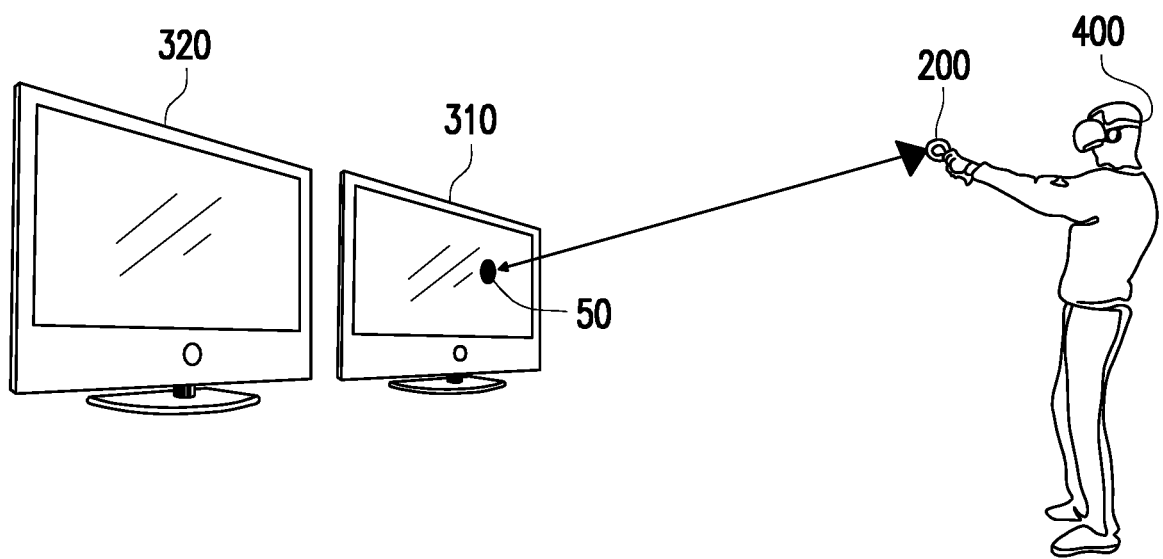
FIG. 5 illustrates a schematic diagram of the cursor shown on the display according to an embodiment of the present invention.

In step S311, the processor 240 of the remote-controller 200 may transmit the position of the cursor to the computing device 100 such that the processor 240 of the remote-controller 200 may control the display 310 (or display 320) to show the cursor via the computing device 100. In step S312, the computing device 100 may send a command to the display 310 (or display 320) according to the position of the cursor to control the display 310 (or display 320) to show the cursor. In step S313, the display 310 (or display 320) may display the cursor according to the command from the computing device 100. FIG. 5 illustrates a schematic diagram of the cursor 50 shown on the display 310 according to an embodiment of the present invention. When the remote-controller 200 aims to the display 310, the corresponding cursor 50 may be shown on the display 310. When the remote-controller 200 aims to the display 320, the corresponding cursor 50 may be shown on the display 320. That is, the cursor 50 corresponding to the remote-controller 200 may move between the display 310 and the display 320.

Referring to FIG. 3, in step S314, the processor 240 of the remote-controller 200 may determine whether the input device 230 is being operated by the user. If the input device 230 is being operated by the user, the processor 240 of the remote-controller 200 may send a command to the computing device 100. In step S315, the computing device 100 may process a task according to the command. In one embodiment, the command is corresponded to the cursor 50. The computing device 100 may process a task according to the cursor 50 in response to receiving the command from the remote-controller 200. The computing device 100 may control the display 310 according to the command corresponding to the cursor 50. For example, the computing device 100 may control the display 310 to show a special effect at the position of the cursor 50 according to the command corresponding to the cursor 50.

In one embodiment, the access right of the display 310 (and/or display 320) may be managed by the computing device 100. The computing device 100 may determine whether to allow the remote-controller 200 to control the display 310 (and/or display 320) via the computing device 100. If the computing device 100 allow the remote-controller 200 to control the display 310 (and/or display 320), the processor 240 of the remote-controller 200 may control the display 310 (and/or display 320) via a communication link between the computing device 100 and the remote-controller 200.

Figure 6:
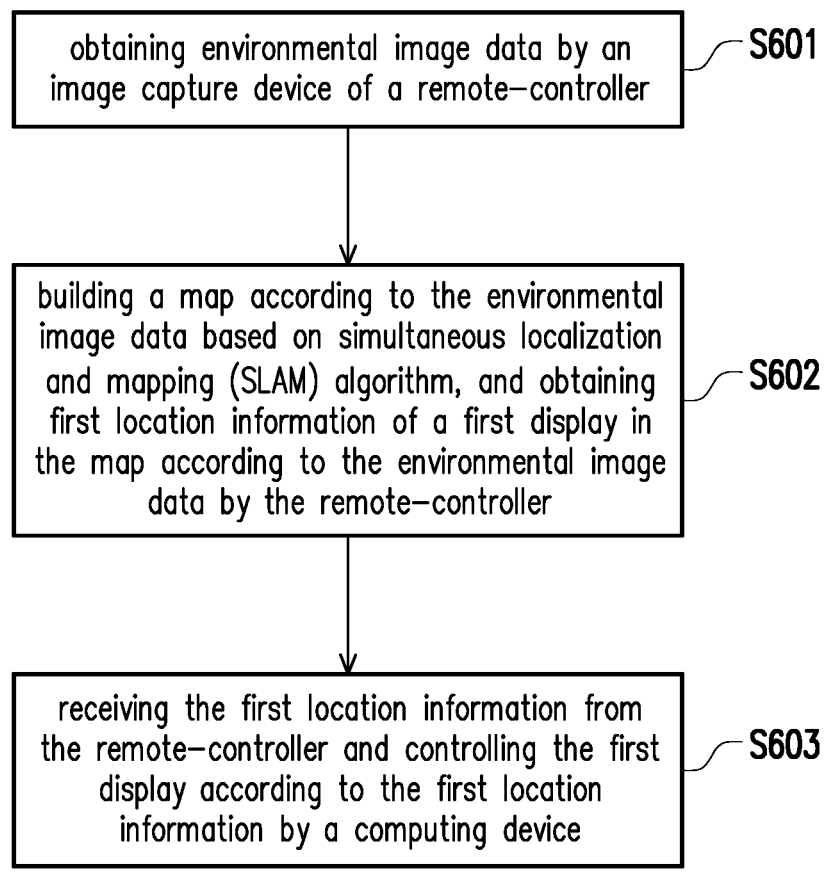
FIG. 6 illustrates a flowchart of a remote-control method according to an embodiment of the present invention.

FIG. 6 illustrates a flowchart of a remote-control method according to an embodiment of the present invention, wherein the remote-control method may be implemented by the remote-control system 10 as shown in FIG. 1. In step S601, obtaining environmental image data by an image capture device of a remote-controller. In step S602, building a map according to the environmental image data based on simultaneous localization and mapping (SLAM) algorithm, and obtaining first location information of a first display in the map according to the environmental image data by the remote-controller. In step S603, receiving the first location information from the remote-controller and controlling the first display according to the first location information by a computing device.

In summary, the remote-control system of the present invention may control the display and the head mounted display by the same remote-controller. The remote-controller may obtain image data by the image capture device and build a coordinate system according to the image data and the SLAM algorithm, wherein the coordinate of the display may be known by the remote-control system. Accordingly, the remote-control system may show the position of the display to the user wearing head mounted display, and the user may interact with the display and the XR scene by using the same remote-controller.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A remote-control system, comprising:
a first display;
a head mounted display;
a remote-controller, comprising an image capture device and an inertial measurement unit, wherein the image capture device obtains environmental image data and the inertial measurement unit obtains pose data of the remote-controller; and
a computing device, communicatively connected to the remote-controller, the head mounted display, and the first display,
wherein the remote-controller builds a map according to the environmental image data based on a simultaneous localization and mapping (SLAM) algorithm,
obtains first location information of the first display in the map according to the environmental image data, and
determines a position of a cursor on the first display according to the pose data and the first location information,
wherein the computing device receives the position of the cursor from the remote-controller and controls the first display to display the cursor according to the position of the cursor,
wherein the computing device controls the head-mounted display to render a virtual object with a shape of the first display in an extended reality scene according to the first location information.

2. The remote-control system according to claim 1, further comprising:
a second display, communicatively connected to the computing device, wherein the remote-controller obtains second location information of the second display in the map according to the environmental image data, wherein
the computing device controls the second display according to the second location information.

3. The remote-control system according to claim 1, wherein the computing device controls the head mounted display to output an image data of the first display according to the first location information.

4. The remote-control system according to claim 1, wherein the remote-controller obtains third location information of the head mounted display and forwards the third location information to the computing device, wherein the computing device controls the head mounted display to output an image data of the first display according to the first location information and the third location information.

5. The remote-control system according to claim 1, wherein the first display displays a positioning marker according to a command from the computing device, wherein the remote-controller obtains the first location information according to the positioning marker included in the environmental image data.

6. The remote-control system according to claim 5, wherein the positioning marker is an Aruco marker.

7. The remote-control system according to claim 1, wherein the computing device controls the first display according to a command corresponding to the cursor.

8. The remote-control system according to claim 1, wherein the remote-controller controls the first display via the computing device, wherein the computing device allow the remote-controller to control the first display via a communication link between the computing device and the remote-controller.

9. The remote-control system according to claim 1, wherein the map is corresponded to a Cartesian coordinate system, and the first location information comprises a coordinate of the first display.

10. A remote-control method, comprising:
obtaining environmental image data by an image capture device of a remote-controller and obtaining pose data of the remote-controller by an inertial measurement unit of the remote-controller;

building a map according to the environmental image data based on a simultaneous localization and mapping (SLAM) algorithm;

obtaining first location information of a first display in the map according to the environmental image data;

determining a position of a cursor on the first display according to the first pose and the first location information by the remote-controller;

receiving the position of the cursor from the remote-controller and controlling the first display to display the cursor according to the position of the cursor by a computing device; and controlling a head-mounted display to render a virtual object with a shape of the first display in an extended reality scene according to the first location information by the computing device.

11. A remote-controller, adapted to control a first display, comprising:

an image capture device, configured to obtain environmental image data;

an inertial measurement unit, configured to obtain pose data of the remote-controller;

a processor, coupled to the image capture device and the inertial measurement unit, configured to build a map according to the environmental image data based on a simultaneous localization and mapping (SLAM) algorithm, obtain first location information of the first display in the map according to the environmental image data, and determine a position of a cursor on the first display according to the pose data and the first location information; and a computing device, coupled to the processor and configured to receive the position of the cursor and control the first display to display the cursor according to the position of the cursor, and configured to control a head-mounted display to render a virtual object with a shape of the first display in an extended reality scene according to the first location information.

* * * * *